US012754113B2

(12) United States Patent
Hoehl et al.

(10) Patent No.: US 12,754,113 B2
(45) Date of Patent: Oct. 6, 2026

(54) THICKNESS CORRECTION FOR VIDEO EXTENSOMETER SYSTEMS AND METHODS

(71) Applicant: Illinois Tool Works Inc., Glenview, IL (US)

(72) Inventors: Christian J. Hoehl, Dinslaken (DE); Adrian Charles Riddick, Medfield, MA (US); Michael Ashman, Natick, MA (US); Nicholas Francisco Salerno, Brighton, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/407,678

(22) Filed: Jan. 9, 2024

(65) Prior Publication Data

US 2024/0142355 A1 May 2, 2024

Related U.S. Application Data

(63) Continuation of application No. 16/915,586, filed on Jun. 29, 2020, now Pat. No. 11,867,668.

(51) Int. Cl.
*G06K 9/00* (2022.01)
*G01N 3/06* (2006.01)
(Continued)

(52) U.S. Cl.
CPC ............... *G01N 3/62* (2013.01); *G01N 3/068* (2013.01); *G06T 7/13* (2017.01); *G06T 7/50* (2017.01);
(Continued)

(58) Field of Classification Search
CPC .. G01N 3/62; G01N 3/068; G01N 2203/0268; G01N 2203/0647; G06T 7/13;
(Continued)

(56) References Cited

U.S. PATENT DOCUMENTS 4,690,001 A * 9/1987 Harvey .................... G01D 5/34 348/294
6,094,259 A * 7/2000 Kamegawa ............ G01B 11/16 73/800
(Continued)

FOREIGN PATENT DOCUMENTS

CN 200972441 11/2007
CN 200972441 Y * 11/2007
(Continued)

OTHER PUBLICATIONS

Advanced video extensometer for non-contact, real-time, high-accuracy strain measurement, Bing Pan et al., Optics Express 19082, Aug. 22, 2016, pp. 1-12 (Year: 2016).*
(Continued)

*Primary Examiner* — Jayesh A Patel
(74) *Attorney, Agent, or Firm* — McAndrews Held & Malloy, Ltd.

(57) ABSTRACT

The present disclosure describes systems and methods to correct for perspective calibration variations of a variable thickness specimen with a single camera extensometer in a video extensometer system. In some examples, the systems and methods compensate for a change between a reference characteristic, such as a calibration plane, and an actual physical characteristic, such as a testing plane associated with a surface of a test specimen, during a testing operation. In some examples, a correction value is applied to an output (e.g., measured dimensions of the imaged test specimen) to compensate for the difference between the reference characteristic and the physical characteristic.

18 Claims, 5 Drawing Sheets

(51) Int. Cl.

| | |
|---|---|
| ***G01N 3/62*** | (2006.01) |
| ***G06T 7/13*** | (2017.01) |
| ***G06T 7/50*** | (2017.01) |
| ***G06T 7/60*** | (2017.01) |

(52) U.S. Cl.

CPC ...... *G06T 7/60* (2013.01); *G06T 2207/10028* (2013.01); *G06T 2207/30204* (2013.01)

(58) Field of Classification Search

CPC ... G06T 7/50; G06T 7/60; G06T 2207/10028; G06T 2207/30204; G01B 11/165; G01B 21/045; G01B 11/16

See application file for complete search history.

(56) References Cited

U.S. PATENT DOCUMENTS

| | | | | |
|---|---|---|---|---|
| 8,600,147 | B2 * | 12/2013 | Iliopoulos | G06T 7/246 382/141 |
| 10,551,169 | B1 * | 2/2020 | Womack | G01B 21/042 |
| 11,867,668 | B2 * | 1/2024 | Hoehl | G06T 7/13 |
| 2003/0182069 | A1 * | 9/2003 | Banes | G01N 3/068 702/33 |
| 2004/0021877 | A1 * | 2/2004 | Clark | G01B 11/0608 356/630 |
| 2007/0070327 | A1 * | 3/2007 | Asundi | G01B 11/161 73/803 |
| 2009/0128685 | A1 * | 5/2009 | Wagner | G06T 7/521 348/E5.022 |
| 2011/0083497 | A1 * | 4/2011 | Matsumiya | G01B 11/245 73/105 |
| 2011/0085177 | A1 * | 4/2011 | Fukumoto | G01B 21/042 356/601 |
| 2012/0176629 | A1 * | 7/2012 | Allen | G01D 5/34746 356/616 |
| 2017/0219468 | A1 * | 8/2017 | Peterson | H04N 7/188 |
| 2018/0216929 | A1 * | 8/2018 | Hoehl | G02B 27/10 |

FOREIGN PATENT DOCUMENTS

| | | | | | |
|---|---|---|---|---|---|
| CN | 100398983 | | | 7/2008 | |
| CN | 100398983 | C | * | 7/2008 | |
| CN | 202188831 | | | 4/2012 | |
| CN | 202188831 | U | * | 4/2012 | |
| CN | 103440629 | | | 12/2013 | |
| CN | 103440629 | A | * | 12/2013 | |
| CN | 103760025 | | | 4/2014 | |
| CN | 105783761 | | | 7/2016 | |
| CN | 105783761 | A | * | 7/2016 | G01B 11/16 |
| CN | 106537087 | X | | 3/2017 | |
| DE | 19960873 | | | 6/2001 | |
| JP | H08226884 | | | 9/1996 | |
| JP | 11257926 | A | * | 9/1999 | |
| JP | H11257926 | | | 9/1999 | |
| JP | 2004317204 | | | 11/2004 | |
| JP | 2004317204 | A | * | 11/2004 | |
| JP | 2005031039 | | | 2/2005 | |
| JP | 2005031039 | A | * | 2/2005 | |
| JP | 2009002679 | | | 1/2009 | |
| JP | 3180646 | | | 12/2012 | |
| WO | 2012171627 | | | 12/2012 | |
| WO | WO-2012171627 | A1 | * | 12/2012 | G01B 11/046 |
| WO | 2014104983 | | | 7/2014 | |
| WO | 2014104986 | | | 7/2014 | |
| WO | WO-2014104983 | A1 | * | 7/2014 | G01N 3/08 |
| WO | WO-2014104986 | A1 | * | 7/2014 | G01B 11/16 |

OTHER PUBLICATIONS

Digital image correlation for surface deformation measurement: historical developments, recent advances and future goals, Bing Pan, IOP Publishing, Jun. 28, 2018, pp. 1-32 (Year: 2018).*

Enhancement of strain accuracy using optical extensometer by application of dual-reflector imaging, Feipeng Zhu et al., IOP Publishing, May 11, 2016, pp. 1-11 (Year: 2016).*

Video Extensometers, Gilbert Vial, Advanced Materials and Processes, Apr. 2004, pp. 33-34 (Year: 2004).*

High-resolution and high-accuracy optical extensometer based on a reflective imaging technique, Feipeng Zhu et al., Elsevier, 2020, pp. 1-10 (Year: 2020).*

Bing Pan: "Digital image correlation for surface deformation measurement: historical developments, recent advances and future goals", Measurement Science and Technology, IOP, Bristol, GB, vol. 29, No. 8, Jun. 28, 2018 (Jun. 28, 2018), p. 82001, XP020329137, ISSN: 0957-0233, DOI: 10.1088/1361-6501/AAC55B [retrieved on Jun. 28, 2018] abstract section 2.2; figures 5-7.

Chen Ji-Hua, Jiang Yan-Yun: "Single-image Based Dimensions Inspection Technology for Planar Industrial Parts", Proc. of SPIE, vol. 7511, 2009, XP040504564, abstract sections 2-5; figures 1-6.

Feipeng Zhu et al: "Enhancement of strain measurement accuracy using optical extensometer by application of dual-reflector imaging", Measurement Science and Technology, IOP, Bristol, GB, vol. 27, No. 6, May 11, 2016 (May 11, 2016), p. 65007, XP020304270, ISSN: 0957-0233, DOI: 10.1088/0957-0233/27/6/065007 [retrieved on May 11, 2016] abstract p. 10, left-hand column last paragraph—p. 10, right-hand column paragraph Two sections 1-3, 5; figures 1-7.

Int'l Search Report and Written Opinion Appln No. PCT/US2021/027825 mailed Jul. 2, 2021.

Japanese Office Action Appln No. 2022-581351 dated Nov. 29, 2024.

European Examination Report Appln No. 21724861.6 dated Apr. 15, 2025.

Korean Office Action Appln No. 10-2023-7001556 dated Jan. 23, 2026.

* cited by examiner

THICKNESS CORRECTION FOR VIDEO EXTENSOMETER SYSTEMS AND METHODS

CROSS REFERENCE TO RELATED APPLICATIONS

This application is a Continuation Application of U.S. patent application Ser. No. 16/915,586 entitled "Thickness Correction For Video Extensometer Systems And Methods" filed Jun. 29, 2020, which is herein incorporated by reference in its entirety.

BACKGROUND

Camera based vision systems have been implemented as part of materials testing systems, for measurement of specimen strain. These systems collect one or more images of a specimen under test, with these images being synchronized with other signals of interest for the test (e.g., specimen load, machine actuator/crosshead displacement, etc.). The images of the test specimen can be analyzed to locate and track specific features of the specimen as the test progresses. Changes in the location of such features, such as a width of the specimen, allows local specimen deformation to be calculated and in turn specimen strain to be computed.

Conventional systems employ cameras or other imaging systems to capture images from which to measure characteristics of the test specimen. However, differences between a reference position and an actual position can lead to distorted readings and inaccurate measurements. Thus, a system to correct for such errors is desirable.

SUMMARY

Disclosed herein are systems and methods to compensate for perspective calibration variations caused by nominally different specimen thicknesses with a single camera extensometer in a video extensometer system. In some examples, the systems and methods compensate for a change between a reference characteristic, such as a calibration plane, and an actual physical characteristic, such as a testing plane associated with a surface of a test specimen, during a testing operation. In some examples, a correction value is applied to an output (e.g., measured dimensions of the imaged test specimen) to compensate for the difference between the reference characteristic and the physical characteristic.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 2:
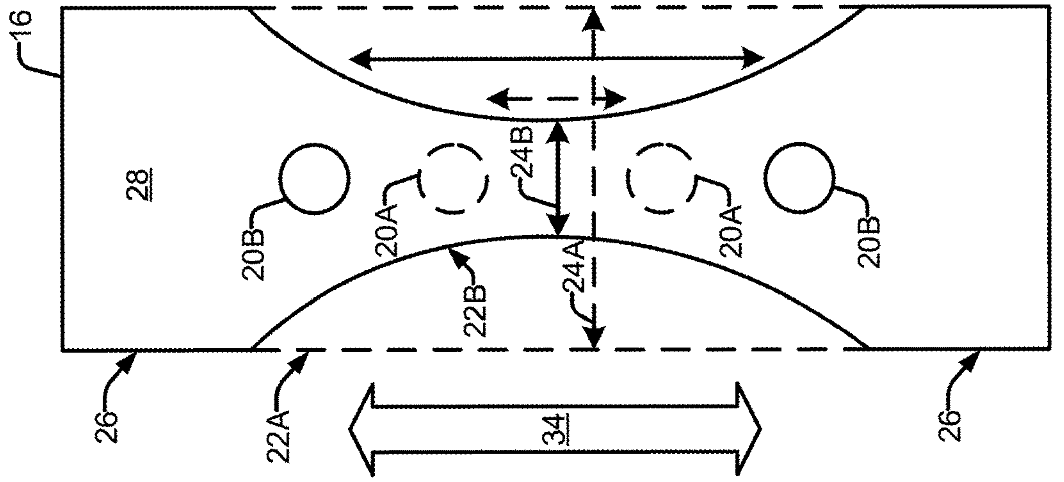
FIG. 2 is an example test specimen for measurement in the extensometer system of FIG. 1, in accordance with aspects of this disclosure.

The present disclosure describes systems and methods to compensate for perspective calibration variations of a variable thickness specimen with a single camera extensometer in a video extensometer system.

Disclosed examples relate to systems and methods for compensating for a change between a reference characteristic, such as a calibration plane, and an actual physical characteristic, such as a testing plane associated with a surface of a test specimen, during a testing operation. In some examples, one or more predetermined geometric variables or characteristics (e.g., measured, calculated and/or accessed via a list) of a test specimen (e.g., specimen width, thickness, edge position, curvature, etc.) are compared against an observed physical geometric variable to determine differences between the predetermined and observed physical variables.

In some examples, the difference is a correction value which is applied to an output (e.g., measured dimensions of the imaged test specimen) to compensate for the difference between the reference characteristic and the physical characteristic.

In some examples, the reference geometric variable is determined during a calibration process. For an optical measurement system, the calibration relationship between apparent optical size of a geometric variable (e.g., such as width, thickness, edge position, curvature, and/or strain) as measured and/or determined using specimen markers of other physical characteristics as captured by an image sensor, and a value associated with the geometric variable being employed by the extensometer measurement system. In some examples, the system continually or periodically measures the geometric variable throughout the testing process. Thus, changes to the geometric variable, and thus the correction value, may be updated during a testing process.

Some conventional testing systems employ camera based vision systems to capture information (e.g., measurements of one or more characteristics or geometric variable) during a material testing process (e.g., to determine strain of the test specimen). Such systems may capture multiple images of the test specimen and synchronize these images with other information associated with the testing process (e.g., specimen load, machine actuator/crosshead displacement, etc.). The images of the test specimen can then be analyzed via one or more algorithms to identify and/or locate specific features of the test specimen, as well as track such features as the testing operation progresses. A change in an absolute and/or relative location of such features allows local specimen deformation to be calculated and, in turn, specimen strain to be computed.

Specimen features of interest may consist of markings applied to a surface of the test specimen visible to the camera. For example, a processor can analyze the image to determine the location and/or geometry (and any change thereof) of the markings, and to track these marks as they move relative to one another during the test. Multiple markings may exist on the front face of the specimen—for example pair groupings for determination of gage length-based strain measurement (axial marks, transverse marks etc.), or quasi random speckle patterns used with Digital Image Correlation (DIC) techniques. An alternative set of features that may be of interest for determination of transverse specimen strain are the edges of the test specimen.

For single camera measurement systems, a calibration process can be performed on a selected calibration plane arranged a predetermined distance from the image sensor. The calibration process establishes the relationship between one or more characteristics (e.g., a size, position, width, etc.) as captured by the imaging device and one or more physical characteristics (e.g., determined in physical coordinates) on the calibration plane.

Such a calibration process may employ a calibration reference device positioned on the calibration plane. The reference device includes predetermined physical characteristics with known geometric dimensions associated with covering some or all of the Field of View (FOV) of interest. The calibration process enables the image of the calibration device to be captured and compared to the known calibration device geometry, with a transfer function being established to convert the image co-ordinates from the pixel co-ordinate system to real-world physical coordinate system.

Conventional video extensometer systems track and measure dimensions and/or relative location of markings on a surface of the test specimen. During a testing process, image processing algorithms are executed (e.g., via a processor of the video extensometer system) to determine the locations of the markings on the surface of the specimen. Based on the determined locations, the processor may calculate the initial specimen gauge length as well as instantaneous changes in specimen gage length from the value(s) at initiation of the test specimen (e.g., axial and/or transverse strain). The accuracy with which the video extensometer system is able to measure absolute and/or relative positions and/or changes in positions of markings is dependent at least in part on whether the surface of the specimen is coplanar with the initial calibration plane. Differences between the locations of the measurement plane (corresponding to the surface of the test specimen) and the calibration plane (corresponding to a reference plane) will produce measurement errors (e.g., perspective errors). As deviations between the measurement and reference planes increase, larger measurement errors result.

In some examples, multiple test specimens are subjected to a testing process following a calibration process, with each specimen having a different thickness. As a result, the distance between the surface of the specimen and the imaging device will change with each specimen.

For a testing device employing symmetric specimen grips, an increase in thickness of z from a first specimen to a second specimen will result in the second specimen being z/2 closer to the video extensometer. If the first specimen had been arranged co-planar with the calibration plane, then second specimen will be z/2 closer to the imaging device, with a consequent shortening of the optical working distance (e.g., in relation to the calibrated working distance). As a result, the measurements of the second specimen based on images captured by the imaging device appear larger than the actual physical characteristics of the second specimen being measured.

Such perspective errors may be more problematic in materials testing applications where measurements of absolute dimensions are sought versus, for example, testing applications where measurements are used to determine proportional (e.g., ratiometric) strain. In proportional strain determinations, perspective error results in similarly proportioned errors in initial gauge length measurements and/or strain displacement measurements. Since strain is calculated as displacement over gage length, the perspective errors cancel out since they exist in both the numerator and denominator.

However, in situations where absolute dimensions are of interest (e.g., when the extensometer is being used to measure strain displacement but initial gage length is being measured using a different system or process), perspective error can become significant. For instance, as the test specimen working distance increasingly deviates from the initial calibration working distance, the perspective error also increases. This may be the case when test specimen thicknesses vary significantly, making it difficult to select a single representative calibration plane to cover all thicknesses.

Conventional systems attempted to mitigate these issues by a variety of techniques, each with significant shortcomings. One option is to a calibration plane arranged in an average or middle plane of all the testing planes of interest, such that perspective measurement errors are optimized across the specimens with different thicknesses. Another option is to make physical adjustments to the test specimen mounting position of the extensometer to compensate for different test specimens in an attempt to maintain a single working distance equal to the calibration plane. Yet another option is to use telecentric optics that are much less sensitive to out of plane perspective errors, yet are more expensive and have a more limited Field of View. In yet another option, multiple cameras can be employed to capture perspective information from different angles, which can be incorporated into a calibration and specimen measurement process.

However, existing solutions to mitigate perspective errors encountered in video extensometer systems all have drawbacks. For instance, using an average distance for the calibration plane and/or using less accurate measurement equipment necessarily yields less accurate measurements. Making manual adjustments of the extensometer mounting position to compensate for different specimen thicknesses is time consuming and requires an operator to remember to make multiple, different adjustments consistently for each specimen based on its individual thickness. Furthermore, such adjustments are difficult to automate.

Telecentric optics are large, heavy and expensive and have limited Fields of View (FOV). Accordingly, video extensometer systems utilizing multiple cameras are expensive, complex, and require extensive three-dimensional calibration processes and equipment.

The disclosed systems and methods mitigates systematic and deterministic errors in a video extensometer that arise from deviations in a measurement plane relative to a calibration plane. In some examples, the errors are corrected in real-time during a testing process. Implemented in a single camera extensometer system, the system is configured to automatically identify and adjust for deviations. Advantageously, the disclosed systems and methods avoid the need to move equipment or specimens for testing different thickness specimens (in order to maintain the calibrated working distance), and/or for recalibration of the video extensometer system for each different working distance created by specimens of varying thicknesses.

As disclosed herein, a video extensometer system is configured to perform optical width measurement of a test specimen. In some examples, edges of a substantially non-transparent test specimen are measured based on a level of brightness contrast between the test specimen and a back screen. For examples, the test specimen it secured within a testing machine and arranged in front of an illuminated (e.g., an actively or passively lit) back screen. An imaging device is arranged to observe a surface of the test specimen that is facing the camera, the surface being close to a focal plane of the imaging device optics (see, e.g., FIG. 3). With this arrangement, the test specimen is viewed and imaged by the imaging device as a dark silhouetted shape, as it is located in front of a brightly illuminated back screen (see, e.g., FIG. 5).

For example, when arranged between the illuminated back screen and the imaging device, the distinctly focused dark silhouette of the test specimen is stark, and the shape and character of the edges are well defined when imaged in front of illuminated back screen. In some examples, the test specimen is made of a material with greater transparency. Such semi-transparent test specimens may absorb some of the light from the light source, sufficient to provide a measurable level of contrast between the test specimen and the back screen.

As described herein, material testing systems, including material testing systems that apply tension, compression, and/or torsion, include one or more components that incur displacement and/or load bearing to apply and/or measure stresses on a test specimen. In some examples, a video extensometer system is employed in specimen strain testing, which can include one or more of collecting high resolution images, providing the images to an image processor, analyzing the images to identify one or more specimen characteristics corresponding to displacement or strain value, and generating an output corresponding to the characteristics. In a disclosed example, the identified characteristics (such as width) from the one or more collected images are compared against one or more sources, such as a list of threshold values or to an image collected previously (i.e. prior to testing). In some examples, a value of the identified characteristic may be applied to one or more algorithms to generate an output corresponding to displacement or strain value associated with the test specimen.

Video processing that employs extensometers may include an external machine vision imaging device connected to a processing system or computing platform and/or video processing hardware and use software and/or hardware to convert the data from the camera to an electrical signal or having a software interface compatible with the materials testing system.

As disclosed herein, image devices employing camera based image capture (e.g., vision or video) systems are implemented in materials testing systems for measurement of strain on the test specimen. Such systems collect multiple images of the specimen under test (i.e. during a testing process), with the images being synchronized with other signals of interest for the test (such as specimen load, machine actuator and/or crosshead displacement, etc.). The images of the specimen are analyzed (e.g., in real-time and/or post-test) by algorithms to locate and track specific specimen characteristics as the test progresses. For instance, a change in a location, size, shape, etc., of such characteristics allows for test specimen deformation to be calculated, which leads in turn to analysis and calculation of specimen strain.

Characteristics such as specimen width may be captured via an imaging device, with the captured image transmitted to a processing system. Image analysis can be performed by the extensometer system (e.g. via the processing system) to determine a first or initial position and/or location of the specimen width(s) to track changes in the width(s) as the test progresses.

The image processing algorithms then determine the edges of the specimen and calculate the width of the specimen and track changes in specimen width compared to the initial width at the beginning of the test (i.e. transverse strain).

Accordingly, the systems and methods disclosed herein compensate for a change between a reference characteristic, such as a calibration plane, and an actual physical characteristic, such as a testing plane associated with a surface of a test specimen, during a testing operation. In some examples, a correction value is applied to an output (e.g., measured dimensions of the imaged test specimen) to compensate for the difference between the reference characteristic and the physical characteristic.

In disclosed examples, a method for correcting for a variable thickness of a test specimen. The method includes determining, via a processing system, a calibration distance between an imaging device and a calibration plane associated with a testing system; receiving, via an interface, a thickness of a test specimen; calculating, via the processing system, a correction factor based in part on the calibration distance and a correction distance equivalent to a difference between a measurement plane and the calibration planes; imaging, via the imaging device, one or more of a marking on the surface of the test specimen or a silhouette of the test specimen to measure one or more characteristics of the test specimen, wherein the surface of the testing specimen corresponds to the measurement plane, the measurement plane offset from the calibration plane by a measurement distance; and generating, via the processor, one or more corrected characteristics by applying a correction factor to the measurements of the one or more characteristics of the test specimen.

In examples, the method further includes calculating, via the processing system, the measurement distance between the imaging device and the surface of the testing specimen as equal to the calibration distance and the offset of calibration plane relative to a centerline of the testing system less one half of the thickness.

In examples, the method further includes calculating, via the processing system, the measurement distance between the imaging device and the surface of the testing specimen as equal to the calibration distance less one half of the thickness.

In examples, the calibration plane is coplanar with a center of the thickness.

In examples, the correction distance is equivalent to one half of the thickness.

In examples, the method further includes sensing, via a sensor, the measurement distance between the imaging device and the surface of the test specimen; transmitting, from the sensor via the interface, the measurement distance to the processor; and generating, via the processor, the correction factor based on a difference between the calibration plane and the measurement plane corresponding to the measurements distance.

In examples, the sensor is an infrared sensor, a light emitting diode sensor, ultrasonic sensor, or a laser enabled sensor.

In examples, the one or more characteristics comprises one or more of a shape or position of the markings, an edge position of the test specimen, or a width of the test specimen.

In examples, the correction factor is in one of millimeters, inches, or pixel units.

In examples, the imaging device is a single view camera.

In some disclosed examples, a system for correcting for a variable thickness of a test specimen. The system includes a testing system to secure a test specimen; a screen to provide illumination to silhouette the test specimen; an imaging device arranged opposite the screen relative to the test specimen and configured to capture images of the test specimen; and a processing system to: determine a calibration distance between an imaging device and a calibration plane associated with the testing system; receive a thickness of a test specimen; calculate a correction factor based in part on the calibration distance and a correction distance equivalent to a difference between a measurement plane and the calibration planes; image one or more of a marking on the surface of the test specimen or a silhouette of the test specimen to measure one or more characteristics of the test specimen, wherein the surface of the testing specimen corresponds to the measurement plane, the measurement plane offset from the calibration plane by a measurement distance; and generate one or more corrected characteristics by applying a correction factor to the measurements of the one or more characteristics of the test specimen.

In examples, the test specimen is arranged between an illuminated screen and the imaging device.

In examples, the interface is one of a user interface or a network interface in communication with a computing device or a sensor.

In examples, the processor is located with a remote computing platform in communication with one or more of the testing system or the imaging device.

In examples, the processor is integrated with one of the imaging device or the testing system.

In examples, the imaging device is a single view camera.

In examples, the imaging device is two or more cameras.

In examples, the imaging device is configured to capture polarized light or infrared light reflected from the screen or the test specimen, wherein the screen reflects light to create a dark silhouette of the test specimen for edge analysis.

In some disclosed examples, a system for correcting for a variable thickness of a test specimen comprising a processing system configured to: receive images from an imaging device of a test specimen during a testing process, wherein the imaging device is arranged opposite a reflective screen relative to the test specimen; determine a calibration distance between the imaging device and a calibration plane associated with the testing system; receive a thickness of a test specimen; calculate a correction factor based in part on the calibration distance and a correction distance equivalent to a difference between a measurement plane and the calibration planes; image one or more of a marking on the surface of the test specimen or a silhouette of the test specimen to measure one or more characteristics of the test specimen, wherein the surface of the testing specimen corresponds to the measurement plane, the measurement plane offset from the calibration plane by a measurement distance; and generate one or more corrected characteristics by applying a correction factor to the measurements of the one or more characteristics of the test specimen.

In examples, the system further includes a sensor to measure the measurement distance between the imaging device and the surface of the test specimen, wherein the processor is configured to generate the correction factor based on a difference between the calibration plane and the measurement plane corresponding to the measurement distance.

Figure 1:
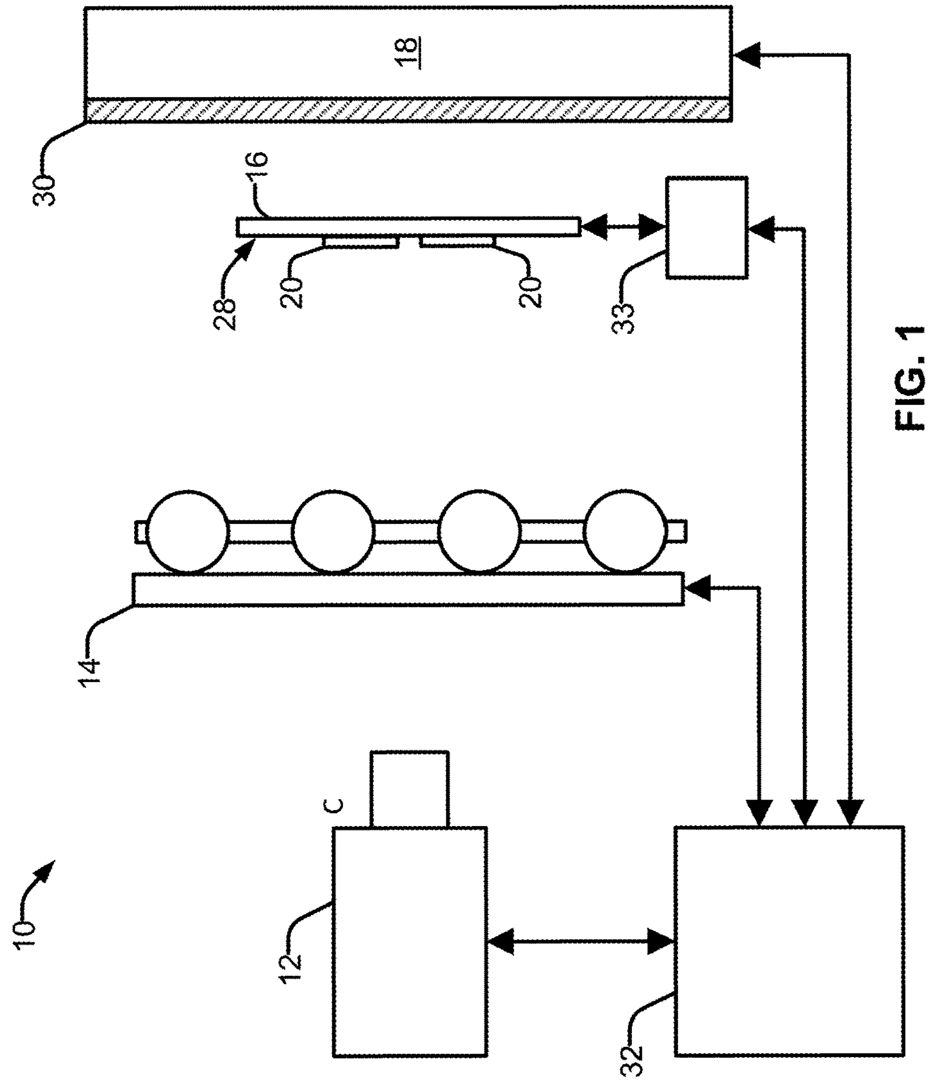
FIG. 1 is a block diagram of an example extensometer system, in accordance with aspects of this disclosure.

Referring now to the figures, FIG. 1 is an example extensometer system 10 to measure changes to one or more characteristics of a test specimen 16 undergoing a mechanical property testing. The example extensometer system 10 may be connected to, for example, a testing system 33 capable of mechanical testing of the test specimen 16. The extensometer system 10 may measure and/or calculate changes in the test specimen 16 subjected to, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally, or alternatively, the material extensometer system 10 may perform dynamic testing.

Figure 6:
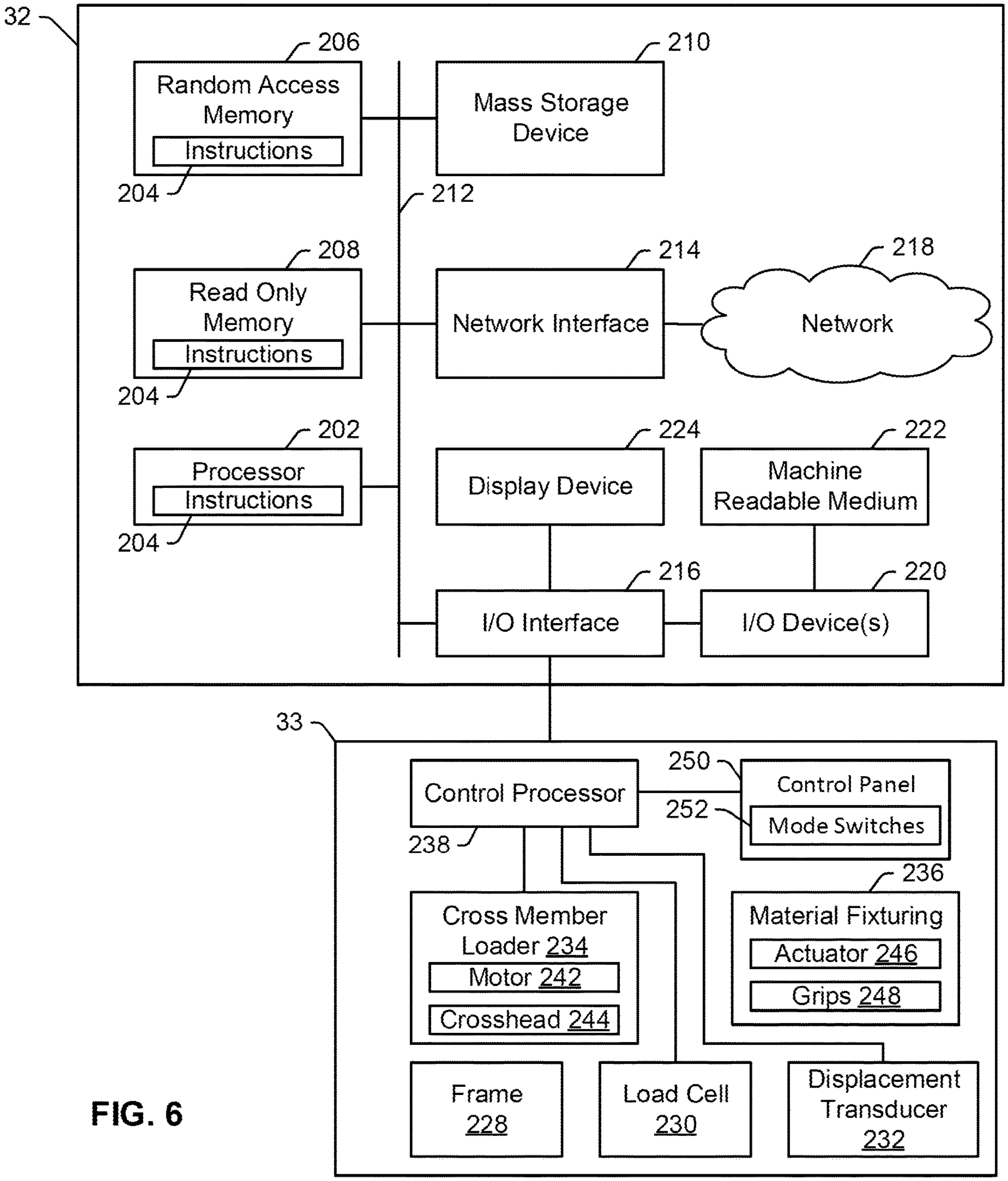
FIG. 6 is a block diagram of an example implementation of the extensometer system of FIG. 1 in accordance with aspects of this disclosure.

In accordance with disclosed examples, the extensometer system 10 may include the testing system 33 for manipulating and testing the test specimen 16, and/or a computing device or processing system 32 communicatively coupled to the testing system 33, the light source, and/or the imaging device, as further shown in FIG. 6. The testing system 33 applies loads to the test specimen 16 and measures the mechanical properties of the test, such as displacement of the test specimen 16 and/or force applied to the test specimen 16.

The extensometer system 10 includes a remote and/or an integral light source 14 (e.g., an LED array) to illuminate the test specimen 16 and/or a reflective back screen 18. The extensometer system 10 includes a processing system 32 (see also FIG. 6) and a camera or imaging device 12. In some examples, the light source 14 and the imaging device 12 are configured to transmit and receive in the infrared (IR) wavelengths; however, other illumination sources and/or wavelengths are similarly applicable. In some examples, one or both of the light source 14 or the imaging device 12 include one or more filters (e.g., a polarizing filter), one or more lenses. In some examples, a calibration routine is performed (e.g., a two-dimensional calibration routine) to identify one or more characteristics of the test specimen 16, one or more markers 20 (including a pattern of markers), is additionally used.

In some examples, the back screen 18 is configured to reflect light from the light source 14 back to the imaging device 12. For example, a surface of the back screen 18 may be configured with properties to enhance reflection and/or direct reflected light toward the imaging device. Properties can include a shape of the back screen 18 (e.g. in a parabolic configuration), and/or a treatment to increase reflection (e.g., application of cube corner reflectors, a reflective material, etc.). Additionally or alternatively, a filter 30 can be arranged and/or applied to a surface to increase the amount of reflection and/or direct reflected light in a desired direction and/or wavelength. In some examples, the filter 30 is configured as a collimating filter, to provide as much reflected light as possible toward the imaging device 12 and away from other nearby components.

In disclosed examples, the computing device 32 may be used to configure the testing system 33, control the testing system 33, and/or receive measurement data (e.g., transducer measurements such as force and displacement) and/or test results (e.g., peak force, break displacement, etc.) from the testing system 33 for processing, display, reporting, and/or any other desired purposes. The extensometer system 10 connects to the testing system 33 and software utilizing standard interfaces that includes Ethernet, analog, encoder or SPI. This allows the device to be plugged into and used by existing systems without the need for specialized integration software or hardware. The extensometer system 10 provides axial and transverse encoder or analog information in real-time to materials testing machine 33. Real-time video extensometer 10 and materials testing machine 33 exchange real-time test data, including extension/strain data, with the external computer 32, which may be configured via a wired and/or wireless communications channel. The extensometer system 10 provides measurement and/or calculation of extension/strain data captured from the test specimen 16 subjected to testing in the materials testing machine 33, which in turn, provides stress and extension/strain data to the processor 32.

As disclosed herein, the captured images are input to the processor 32 from the imaging device, where one or more algorithms and/or look up tables are employed to calculate multiple axes of extension/strain values for the test specimen 16 (i.e., the change or percentage change in inter-target distance as calculated by image monitoring of the markers 20 affixed to the test specimen 16). Following computation, the data may be stored in memory or output to a network and/or one or more display devices, I/O devices, etc. (see also FIG. 6).

FIG. 2 is an example test specimen 16 for measurement in the extensometer system 10 of FIG. 1. For example, one or more markings are applied to the surface 28 facing the light source 14 and imaging device 12. Grip sections 26 are configured for placement within a grip of the testing system 33 (see also FIG. 6), and apply force to the test specimen 16. For example, a cross-member loader applies force to the specimen 16 under test, while the grips grasp or otherwise couple the test specimen 16 to the testing system 33. A force applicator such as a motor causes the crosshead to move with respect to the frame to apply force to the test specimen 16, as illustrated by double arrow 34. Forces 34 pulling the grip sections 26 away from one another may elongate the test specimen 16, resulting in the markings moving from a first position 20A to a second position 20B. Additionally or alternatively, the markings may change shape or size, which may also be measured by the processing system 32 in view of the captured images. The forces 34 may also cause the edges of the test specimen to move from a first position 22A to a second position 22B. For example, at the first or initial position, the edges have a width 24A, which is reduced to width 24B upon application of the forces 34.

Based on the captured images, the processing system 33 is configured to implement an extension/strain on measurement process. For example, to detect an extension/strain on the test specimen 16, the processing system 33 monitors the images provided via the imaging device 12. When the processing system 33 identifies a change in relative position between two or more of the markers and/or the edges of the test specimen 16 (e.g., compared to an initial location at a beginning of movement of the crosshead), the processing system 33 measures the amount of change to calculate the amount of extension and/or strain on the test specimen 16. As disclosed herein, the markers are configured to reflect light from the light source to the camera, whereas the back screen reflects light to create a dark silhouette for edge analysis.

As disclosed herein, the video extensometer system 10 is configured to perform optical width measurement of non-transparent test specimen 16. The imaging device 12 is arranged to observe the surface 28 of the test specimen 16 that is facing the imaging device 12, the surface 28 being close to a focal plane of the imaging device optics (see, e.g., FIG. 3). With this arrangement, the test specimen 16 is viewed and imaged by the imaging device 12 as a dark silhouetted shape, as it is located in front of the brightly illuminated back screen 18.

Figure 3:
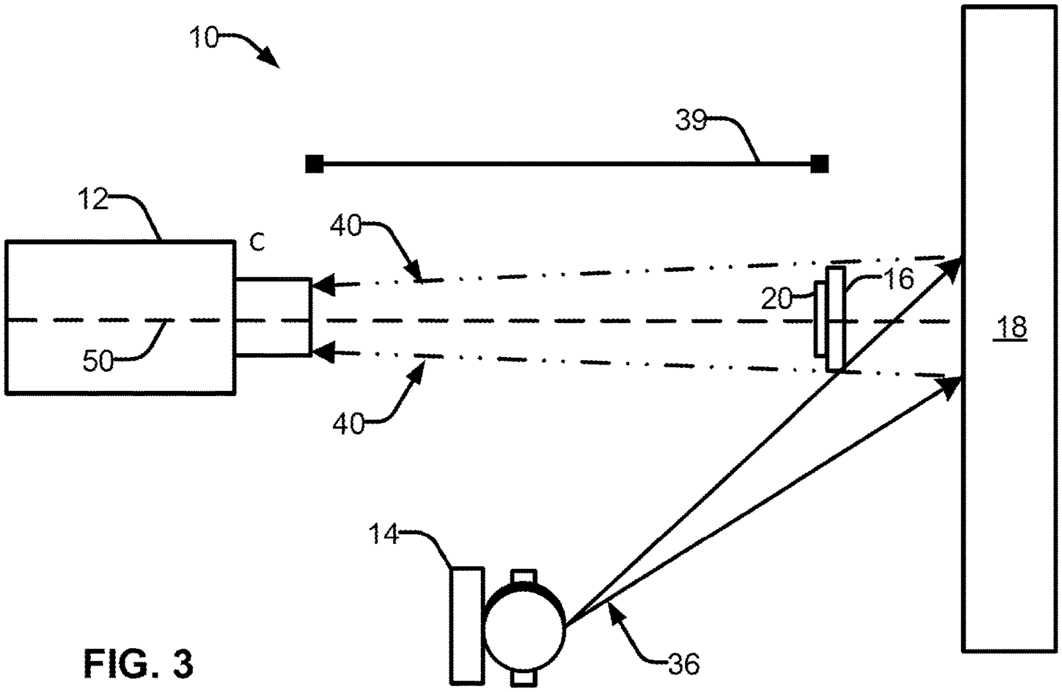
FIG. 3 is a block diagram of an alternate view of the example extensometer system of FIG. 1, in accordance with aspects of this disclosure.

As show in FIG. 3, a video extensometer system 10 is arranged to measure one or both of axial strain (based on changes in markers 20 and/or a pattern of markers on the test specimen 16 front surface 28), and transverse strain (calculated from changes in width of the specimen 16). The components of the video extensometer system 10 are shown in a top perspective in FIG. 3, with general locations of each component relative to the others. As shown, the components include an imaging device 12 (e.g., a video camera) configured to capture one or more images of the test specimen 16 during the physical test (e.g., at regular intervals, continuously, and/or based on one or more threshold values associated with time, force, or other suitable test characteristic).

One or more light sources 14 emit light 36 to illuminate a surface 28 of the test specimen 16 and a screen 18 that is arranged facing a rear surface of the test specimen 16 opposite the light source 14. In some examples, the light source(s) 14 are arranged to direct light off-axis (e.g., in an upwards, sideways, and/or downwards direction shown from a top elevation in view of FIG. 3), and angled to illuminate the front surface 28 of the test specimen 16 and/or the back screen 18.

As shown, a passive (i.e. lacking active illumination source) back screen 18 is arranged to the rear of the test specimen 16, designed with reflective properties and of a size suitable to present a uniformly bright background to the video extensometer imaging device 12. As shown in FIG. 3, light 36 incident on back screen 18 is reflected back as light 40 directed toward imaging device 12. In some examples, an actively illuminated back screen is used, the brightness level of which can be adjusted by the processing system 32. As shown, the imaging device 12 and test specimen 16 are arranged at a focal distance 39, which during the testing process may be static, predetermined, and/or changing. The light from the back screen 18 creates a darkened silhouette of the test specimen 16, allowing the imaging device 12 to capture images of the edges 22, and changes thereof, during the testing process.

The test specimen 16 is located between the imaging device 12 and the back screen 18. The test specimen 16 features suitable marks 20 on the front facing surface 28 of the test specimen 16. Analysis of the one or more images associated with the video extensometer system 10 is implemented via processing system 32 to perform identification algorithms that allow both the test specimen 16 markings 20 and the test specimen edges 22 to be continuously tracked and measured during the test process.

For example, when arranged between the illuminated back screen 18 and the imaging device 12, the distinctly focused dark silhouette of the test specimen 16 is stark, and the shape and character of the edges 22 are well defined when imaged in front of illuminated back screen 18. However, performing highly accurate measurements can be difficult, as the perceived position of the test specimen 16 may be offset by a variable thickness of the test specimen. For example, even following a calibration process, a calibration plane is determined in accordance with a thickness of a specimen used to calibrate the system 10. When another test specimen having a different thickness is subjected to such a calibrated system, the reference plane (e.g., the calibration plane) is offset based on the thickness, and imaging errors result.

Figure 4:
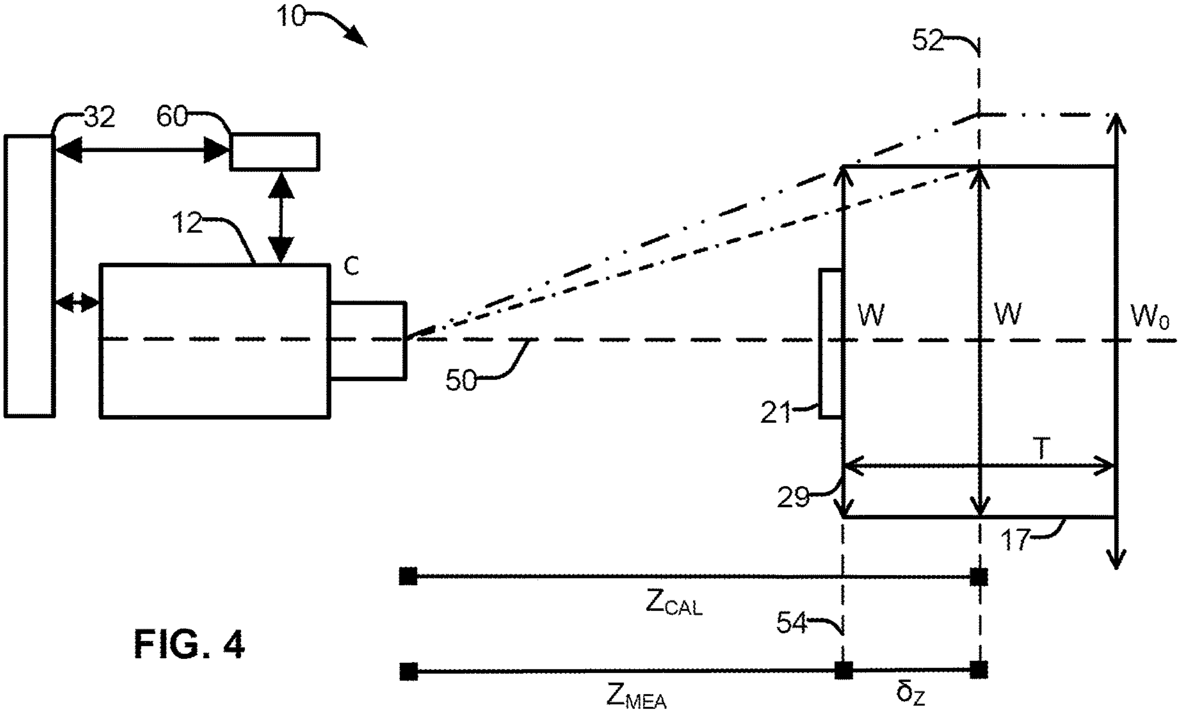
FIG. 4 is a block diagram of a calibration and testing operation in the example extensometer system of FIG. 1, in accordance with aspects of this disclosure.

Turning now to FIG. 4, video extensometer system 10 is arranged to measure one or more characteristics of a test specimen 17 with a width W. For example, the one or more characteristics can include one or more of a shape or position of a marking 21, an edge position of the test specimen 17, or a width of the test specimen 17.

When a surface 29 of the test specimen 17 is located on a calibration plane 52, the perceived dimensions of the one or more characteristics by the extensometer will be optically accurate and faithfully reflect the physical characteristics of the test specimen 17. However, when the test specimen 17 is displaced away from the calibration plane 52 by an amount dz, as shown in FIG. 4, the perceived dimensions of the test specimen 17 to the video extensometer will include error, such that the width W is observed as $W_0$. In other words, due to a thickness T of the test specimen 17, and the offset of the surface 29 relative to the calibration plane 52, the actual physical dimensions W is inaccurately captured by the imaging device 12.

For examples, during a calibration process, a distance $Z_{cal}$ is determined as a distance between the aperture of the image device 12 and the calibration plane 52. When a testing process is to be performed on the test specimen 17, the distance between the surface 29 of the test specimen 17 is measured and the calibration plane 52 is defined by dz. However, the width W of the test specimen 17 will appear magnified in captured images, as the thickness T creates displacement from the distance $Z_{cal}$ by distance dz. Accordingly, the imaging device 12 will perceive the width of the test specimen 17 as $W_0$, rather than the true physical width W. As disclosed herein, the true physical width W of the test specimen can be calculated by correcting for the displacement, as provided in Equation 1:

$$w = w_0 \frac{z_{cal} + \delta z}{z_{cal}} = w_0\left(1 + \frac{\delta z}{z_{cal}}\right),$$

$$\text{or } w = cw_0 \text{ with correction factor } c = 1 + \frac{\delta z}{z_{cal}}.$$

When dz is negative (e.g., the measurement plane 54 is closer to the video extensometer system 10 than the calibration plane 52), each measured characteristic is magnified. This is reflected by a correction factor less than one to recover true physical specimen width.

If the video extensometer system 10 is calibrated in a known fixed plane relative to a centerline 50 of the imaging device 12, and the specimen is secured via one or more grips ensures that the specimen centerline is maintained on the centerline 50, then it follows that the specimen surface on the measurement plane 54 offset caused by a change in nominal specimen thickness can be calculated as being half of the specimen thickness. The compensation factor c can therefore be calculated prior to each test using the specimen thickness information entered by an operator into the materials testing software, for the specific specimen being tested. The compensation factor c can be employed by the processor 202 to calculate dimensions of interest, and the output from the processor thereby represents a corrected measurement. Thus, perspective error due to non-coincident test and calibration planes has been removed.

As shown in FIG. 4, the calibration plane 52 is coplanar with a center of the thickness T. In some examples, a measurement distance $Z_{mea}$ between the imaging device 12 and the surface 29 of the testing specimen 17 as equal to the calibration distance $Z_{cal}$ less one half of the thickness T.

As shown in the illustrated example, when the grips of the testing system maintain a central plane for loading test specimens, the correction distance dz is equivalent to one half of the thickness T. However, if the central plane is variable (e.g., one or more of a front or rear surface of a loader and/or grip is fixed), the system can determine the difference by known parameters (e.g., the offset distance associated with the fixed surface and/or the thickness of the test specimen) and/or by employing one or more sensors to determine the measurement distance $Z_{mea}$, the correction distance dz, etc.

For example, the system 10 may employ a sensor 60 to measure one or more features of the testing system 10 arrangement. For instance, the sensor 60 can employ one or more techniques (e.g., an infrared (IR) light, a light emitting diode (LED) output, an ultrasonic sensor, structured light imaging, time of flight calculations, a laser enabled sensor, etc.) to sense the measurement distance $Z_{mea}$ between the imaging device 12 and the surface 29 of the test specimen 17. The results can be transmitting from the sensor 60 to a computing device (e.g., computing device 32 via an interface) for analysis. The computing device can then generate the correction factor c based on a difference between the calibration plane 52 and the measurement plane 54 corresponding to the correction distance dz.

In the illustrated example, the imaging device 12 is a single view camera with a single optical axis 50. In some examples, two or more imaging devices may be employed, which may be collocated and/or arranged with different viewing angles of the testing specimen 17. By employing stereo imaging arrangements, measurement variables associated with perspective and/or depth of multiple dimensions of the test specimen 17 may also be used to further calibrate and/or measure characteristics of the test specimen 17.

In some examples, the measurements and/or position of the one or more edges are provided in pixel coordinates, as captured by the imaging device 12. Additionally or alternatively, the measurements and/or position of the one or more edges are provided in other standard coordinate systems/units, such as meters. In such an example, a calibration process can be implemented to determine absolute and/or relative placement and/or dimensions of the test specimen within the test system prior to measurement, and a similar coordinate system/units can be employed during a testing process.

Figure 5:
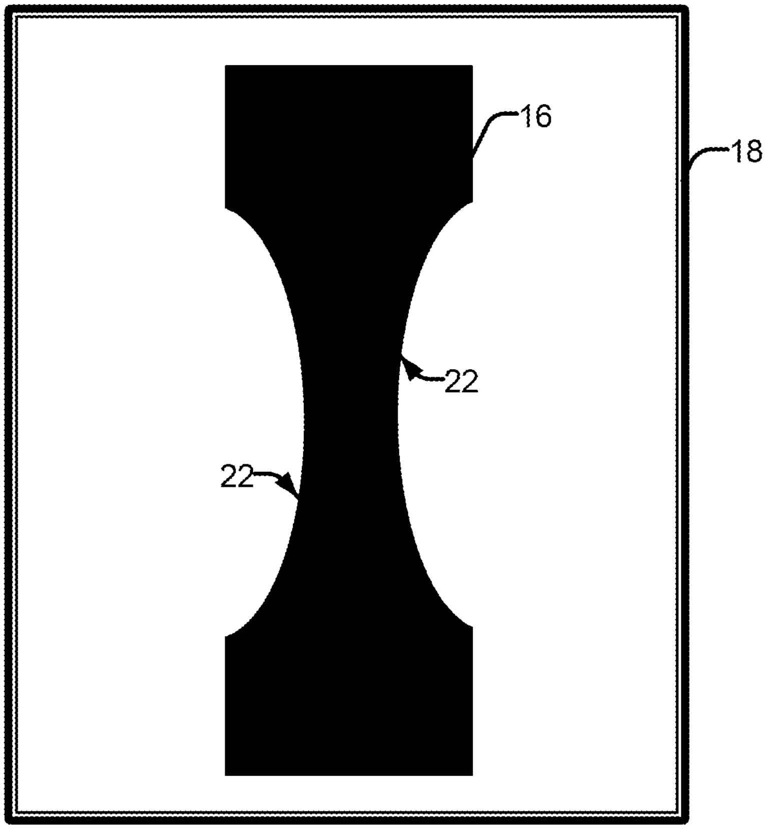
FIG. 5 illustrates a captured image of a test specimen, in accordance with aspects of this disclosure.

FIG. 5 illustrates a captured image of a test specimen 16, but the following description is equally applicable to other test specimens, such as test specimen 17. As shown, the distinctly focused dark silhouette of test specimen 16 is stark, and the shape and character of the edges 22 are well defined when imaged in front of illuminated back screen 18. If the testing process was limited to a comparison of multiple images over time, perception errors due to an offset of the measurement plane and the calibration plane would have a limited impact. However, in order to capture absolute measurements of the imaged test specimen, the offset distance between the measurement plane and the calibration plane is corrected for by the systems and methods disclosed herein.

FIG. 6 is a block diagram of an example extensometer system 10 of FIG. 1. As shown in FIG. 1, the extensometer system 10 includes the testing system 33 and the computing device 32. The example computing device 32 may be a general-purpose computer, a laptop computer, a tablet computer, a mobile device, a server, an all-in-one computer, and/or any other type of computing device. The computing device 32 of FIG. 6 includes a processor 202, which may be a general-purpose central processing unit (CPU). In some examples, the processor 202 may include one or more specialized processing units, such as FPGA, RISC processors with an ARM core, graphic processing units, digital signal processors, and/or system-on-chips (SoC). The processor 202 executes machine-readable instructions 204 that may be stored locally at the processor (e.g., in an included cache or SoC), in a random access memory 206 (or other volatile memory), in a read-only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device. A bus 212 enables communications between the processor 202, the RAM 206, the ROM 208, the mass storage device 210, a network interface 214, and/or an input/output interface 216.

An example network interface 214 includes hardware, firmware, and/or software to connect the computing device 201 to a communications network 218 such as the Internet. For example, the network interface 214 may include IEEE 202. X-compliant wireless and/or wired communications hardware for transmitting and/or receiving communications.

An example I/O interface 216 of FIG. 6 includes hardware, firmware, and/or software to connect one or more input/output devices 220 to the processor 202 for providing input to the processor 202 and/or providing output from the processor 202. For example, the I/O interface 216 may include a graphics-processing unit for interfacing with a display device, a universal serial bus port for interfacing with one or more USB-compliant devices, a FireWire, a field bus, and/or any other type of interface. The example extensometer system 10 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 32 may access a non-transitory machine-readable medium 222 via the I/O interface 216 and/or the I/O device(s) 220. Examples of the machine-readable medium 222 of FIG. 6 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The extensometer system 10 further includes the testing system 33 coupled to the computing device 32. In the example of FIG. 6, the testing system 33 is coupled to the computing device via the I/O interface 216, such as via a USB port, a Thunderbolt port, a FireWire (IEEE 1394) port, and/or any other type serial or parallel data port. In some examples, the testing system 33 is coupled to the network interface 214 and/or to the I/O interface 216 via a wired or wireless connection (e.g., Ethernet, Wi-Fi, etc.), either directly or via the network 218.

The testing system 33 includes a frame 228, a load cell 230, a displacement transducer 232, a cross-member loader 234, material fixtures 236, and a control processor 238. The frame 228 provides rigid structural support for the other components of the testing system 33 that perform the test. The load cell 230 measures force applied to a material under test by the cross-member loader 234 via the grips 236. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the extensometer system 10 include electric motors, pneumatic actuators, hydraulic actuators, piezoelectric actuators, relays, and/or switches.

While the example testing system 33 uses a motor 242, such as a servo or direct-drive linear motor, other systems may use different types of actuators. For example, hydraulic actuators, pneumatic actuators, and/or any other type of actuator may be used based on the requirements of the system.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The extensometer system 10 may further include one or more control panels 250, including one or more mode switches 252. The mode switches 252 may include buttons, switches, and/or other input devices located on an operator control panel. For example, the mode switches 252 may include buttons that control the motor 242 to jog (e.g., position) the crosshead 244 at a particular position on the frame 228, switches (e.g., foot switches) that control the grip actuators 246 to close or open the pneumatic grips 248, and/or any other input devices to control operation of the testing system 33.

The example control processor 238 communicates with the computing device 32 to, for example, receive test parameters from the computing device 32 and/or report measurements and/or other results to the computing device 32. For example, the control processor 238 may include one or more communication or I/O interfaces to enable communication with the computing device 32. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example control processor 238 is configured to implement an extension/strain measurement process when a test specimen 16 is subjected to testing in the testing system 33. For example, to detect an extension/strain on the test specimen 16, the control processor 238 monitors the images provided via the imaging device 12. When the control processor 238 identifies a change in location and/or position of the edges 22 of the test specimen 16 (e.g., compared to an initial location at a beginning of movement of the crosshead 244), the control processor 238 measures the amount of change to calculate the amount of extension and/or strain on the test specimen 16. For example, real-time video provided by the imaging device 12 captures the absolute position of edges 22, and monitors their relative movement over the course of the several images to calculate extension/strain in real time. The stress data and the strain data exchanged among the real-time video extensometer 10, the testing system 33 and the processing system 32, and typically organized and displayed via the display device 224.

Figure 7:
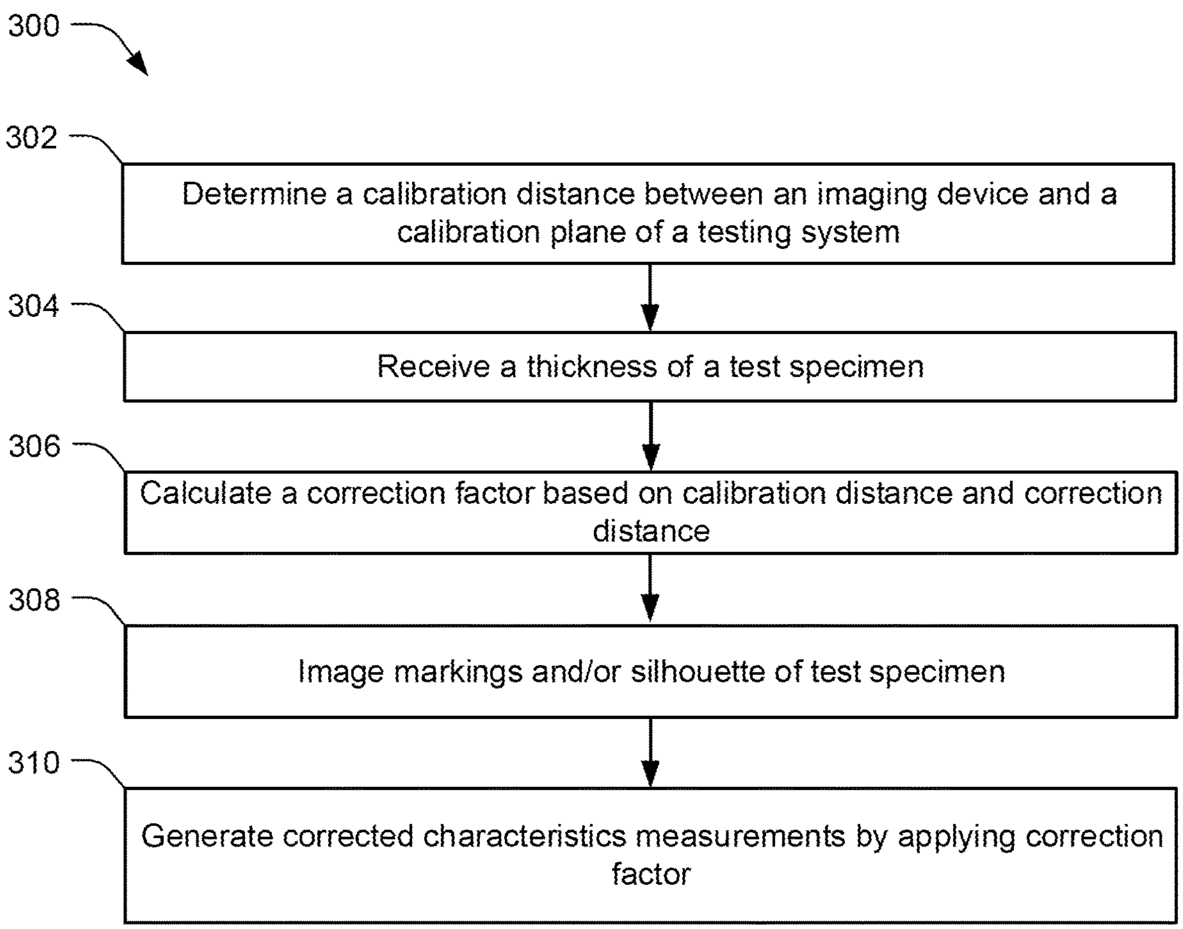
FIG. 7 shows a flowchart representative of example machine-readable instructions to correct for brightness distortion of a test specimen in an extensometer system, in accordance with aspects of this disclosure.

FIG. 7 shows a flowchart representative of example machine readable instructions 300 which may be executed by the processing system 32 of FIGS. 1 and 6 to correct for a variable thickness of a test specimen in an extensometer system. At block 302, a calibration distance is determined at a processor (e.g., processor 202, 238) between an imaging device (e.g., imaging device 12) and a calibration plane associated with a testing system (e.g., testing system 10).

At block 304, a thickness of a test specimen (e.g., test specimen 16, 17) is received, such as from a remote computing device via I/O interface 216 and/or a user input via I/O device(s) 220. At block 306, a correction factor is calculated based in part on the calibration distance and a correction distance equivalent to a difference between a measurement plane and the calibration planes.

At block 308, one or more of a marking on the surface of the test specimen or a silhouette of the test specimen are imaged to measure one or more characteristics of the test specimen. In some examples, the surface of the testing specimen corresponds to the measurement plane, the measurement plane offset from the calibration plane by a measurement distance. At block 310, one or more corrected characteristics are generated by applying a correction factor to the measurements of the one or more characteristics of the test specimen.

In some examples, the system is configured to compensate for angle offset of an imaging device relative to a test specimen (and/or a testing platform, loading structure, etc.). For instance, the imaging device may be arranged at an angle relative to the orientation of the test specimen, which may produce an image similarly offset. The system may adjust the orientation of the image by an equivalent and opposite angle offset to render an image without a perceived angle. This can be achieved by arranging the imaging device by a known angle offset and applying an equivalent angle value to the image.

In some examples, the system calculates the angle offset, such as via one or more sensors. After receipt of the test specimen images, characteristics associated with one or more positions (e.g., one or more horizontal positions) along the test specimen (e.g., width) are measured, and an error value for the characteristics is calculated based on the angle. The measurement can be adjusted based on the error value to provide a corrected measurement of the characteristic(s).

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer-readable) medium (e.g., FLASH drive, optical disk, magnetic storage disk, or the like) having stored thereon one or more lines of code executable by a machine, thereby causing the machine to perform processes as described herein. As used herein, the term “non-transitory machine-readable medium” is defined to include all types of machine-readable storage media and to exclude propagating signals.

As utilized herein the terms “circuits” and “circuitry” refer to physical electronic components (i.e. hardware) and any software and/or firmware (“code”) which may configure the hardware, be executed by the hardware, and or otherwise be associated with the hardware. As used herein, for example, a particular processor and memory may comprise a first “circuit” when executing a first one or more lines of code and may comprise a second “circuit” when executing a second one or more lines of code. As utilized herein, “and/or” means any one or more of the items in the list joined by “and/or”. As an example, “x and/or y” means any element of the three-element set {(x), (y), (x, y)}. In other words, “x and/or y” means “one or both of x and y”. As another example, “x, y, and/or z” means any element of the seven-element set {(x), (y), (z), (x, y), (x, z), (y, z), (x, y, z)}. In other words, “x, y and/or z” means “one or more of x, y and z”. As utilized herein, the term “exemplary” means serving as a non-limiting example, instance, or illustration. As utilized herein, the terms “e.g.,” and “for example” set off lists of one or more non-limiting examples, instances, or illustrations. As utilized herein, circuitry is “operable” to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, rearranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A method for correcting for a variable thickness of a test specimen in one or more images of the test specimen captured by an imaging device of a testing system, the method comprising:

receiving, via an interface, a thickness of a test specimen, the thickness corresponding to a distance between a first surface of the test specimen and a second surface of the test specimen opposite the first surface, the first and second surfaces being generally perpendicular to a centerline extending from the imaging device;

determining, via a processing system, a position of a measurement plane based on the received thickness of the test specimen, the measurement plane corresponding to the first surface of the test specimen;

calculating, via a processing system, a correction factor based in part on a calibration distance defined by a calibration plane associated with the testing system, and further based in part on a correction distance between the measurement plane and the calibration plane;

receiving, via the interface, the one or more images of the test specimen, wherein:

in each of the one or more images, the first surface of the test specimen is facing the imaging device, and each of the one or more images is associated with one or more measurements of the test specimen; and generating, via the processing system, one or more corrected characteristics by applying the correction factor to at least one of the one or more measurements of the test specimen.

2. The method of claim 1, further comprising calculating, via the processing system, a measurement distance between the imaging device and the first surface of the testing specimen as equal to the calibration distance less one half of the thickness, wherein the calculating of the correction factor is further based in part on the measurement distance.

3. The method of claim 1, wherein the calibration plane is coplanar with a center of the thickness.

4. The method of claim 1, wherein the correction distance is equivalent to one half of the thickness.

5. The method of claim 1, further comprising:

sensing, via a sensor, a measurement distance between the imaging device and the first surface of the test specimen; and transmitting, from the sensor via the interface, the measurement distance to the processing system, wherein the calculating of the correction factor is further based in part on the measurements distance.

6. The method of claim 5, wherein each of the one or more images comprises one or more features of the test specimen;

each of the one or more features is associated with one or more characteristics of the test specimen; and each of the one or more measurements are of at least one of the one or more characteristics.

7. The method of claim 6, wherein:

each of the one or more features comprises at least one of a marking on the first surface of the test specimen or a silhouette of the test specimen; and each of the one or more characteristics comprises one or more of a shape or position of the marking, an edge position of the test specimen, or a width of the test specimen.

8. A system for correcting for a variable thickness of a test specimen, the system comprising:

a testing system to secure a test specimen, the testing system comprising an imaging device configured to capture one or more images of the test specimen, wherein:

the test specimen comprises a first surface and a second surface opposite the first surface, the first and second surfaces being generally perpendicular to a centerline extending from the imaging device, and in each of the one or more images, the first surface is facing the imaging device; and a processing system configured to:

receive a thickness of a test specimen, the thickness corresponding to a distance between the first surface of the test specimen and the second surface of the test specimen;

determining, via a processing system, a position of a measurement plane based on the received thickness of the test specimen, the measurement plane corresponding to the first surface of the test specimen;

calculate a correction factor based in part on a calibration distance defined by a calibration plane associated with the testing system, and based in part on a correction distance between the measurement plane and the calibration plane;

receive the one or more images of the test specimen, wherein each of the one or more images is associated with one or more measurements of the test specimen; and generate one or more corrected characteristics by applying the correction factor to at least one of the one or more measurements of the test specimen.

9. The system of claim 8, wherein:

the testing system further comprises a screen;

the testing system is further configured to illuminate at least part of the screen; and the test specimen between the screen and the imaging device.

10. The system of claim 8, wherein the processing system calculates the correction factor based in part on a measurement distance between the imaging device and the first surface of the test specimen.

11. The system of claim 8, wherein the imaging device is configured to capture infrared light, wherein at least some of the infrared light is reflected from the screen and at least some of the infrared light is reflected from the test specimen.

12. The system of claim 8, wherein the imaging device is a single view camera.

13. The system of claim 8, wherein the imaging device is two or more cameras.

14. The system of claim 8, wherein the imaging device is configured to capture polarized light, wherein a portion of the polarized light is reflected from the screen and a portion of the polarized light is reflected from the test specimen.

15. A processing system for correcting for a variable thickness of a test specimen in one or more images of the test specimen captured by an imaging device of a testing system, the processing system configured to:

receive a thickness of a test specimen, the thickness corresponding to a distance between a first surface of the test specimen and a second surface of the test specimen opposite the first surface, the first and second surfaces being generally perpendicular to a centerline extending from the imaging device;

determine a position of a measurement plane based on the received thickness of the test specimen, the measurement plane corresponding to the first surface of the test specimen;

calculate a correction factor based in part on a calibration distance defined by a calibration plane associated with the testing system, and in part on a correction distance between the measurement plane and the calibration plane;

receive the one or more images of the test specimen, wherein:

in each of the one or more images, the first surface is facing the imaging device, and each of the one or more images is associated with one or more measurements of the test specimen; and generate one or more corrected characteristics by applying a correction factor to at least one of the one or more measurements of the test specimen.

16. The processing system of claim 15, further configured to determine the calibration distance.

17. The processing system of claim 15, wherein the calculating of the correction factor is further based in part on a measurement distance between the imaging device and the first surface of the test specimen.

18. The processing system of claim 15, wherein:

each of the one or more images comprises one or more features of the test specimen;

each of the one or more features is associated with one or more characteristics of the test specimen; and each of the one or more measurements are of at least one of the one or more characteristics.

* * * * *